US011238179B2

(12) United States Patent
Fukuda

(10) Patent No.: US 11,238,179 B2
(45) Date of Patent: Feb. 1, 2022

(54) DATA TRANSFER METHOD AND RECORDING MEDIUM

(71) Applicant: Panasonic Intellectual Property Management Co., Ltd., Osaka (JP)

(72) Inventor: Naohiro Fukuda, Chiba (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 0 days.

(21) Appl. No.: 16/500,768

(22) PCT Filed: May 9, 2018

(86) PCT No.: PCT/JP2018/017990
§ 371 (c)(1),
(2) Date: Oct. 3, 2019

(87) PCT Pub. No.: WO2018/221145
PCT Pub. Date: Dec. 6, 2018

(65) Prior Publication Data
US 2020/0065523 A1 Feb. 27, 2020

(30) Foreign Application Priority Data
May 29, 2017 (JP) .............................. JP2017-105476

(51) Int. Cl.
*G06F 21/62* (2013.01)
*H04L 12/58* (2006.01)

(52) U.S. Cl.
CPC .......... *G06F 21/6254* (2013.01); *H04L 51/02* (2013.01); *H04L 51/046* (2013.01)

(58) Field of Classification Search
USPC ........................................................... 726/26
See application file for complete search history.

(56) References Cited

U.S. PATENT DOCUMENTS

| 8,145,708 B2 | 3/2012 | Biggs et al. |
| 8,336,098 B2 * | 12/2012 | Lee ........................ H04L 63/145 726/22 |
| 2005/0138132 A1 | 6/2005 | Zhou et al. |
| 2005/0149630 A1 * | 7/2005 | Smolinski ............... H04L 51/04 709/227 |

(Continued)

FOREIGN PATENT DOCUMENTS

| JP | 2009-003533 A | 1/2009 |
| JP | 2009-193259 A | 8/2009 |
| JP | 2010-086503 A | 4/2010 |

OTHER PUBLICATIONS

International Search Report issued in corresponding International Patent Application No. PCT/JP2018/017990, dated Jun. 5, 2018, with English translation.

(Continued)

*Primary Examiner* — Sakinah White Taylor
(74) *Attorney, Agent, or Firm* — McDermott Will & Emery LLP

(57) ABSTRACT

A chat system transfers chat data transmitted from a user terminal to a chat bot or another user terminal via a network. When the chat data transmitted from the user terminal is detected to include a content related to personal information, the chat system performs a predetermined filtering process on the chat data.

7 Claims, 10 Drawing Sheets

(56) References Cited

U.S. PATENT DOCUMENTS

| | | | |
|---|---|---|---|
| 2008/0114837 A1 | 5/2008 | Biggs et al. | |
| 2008/0276315 A1 | 11/2008 | Shuster | |
| 2011/0206198 A1* | 8/2011 | Freedman | H04M 3/51 |
| | | | 379/265.03 |
| 2014/0344718 A1* | 11/2014 | Rapaport | H04L 51/32 |
| | | | 715/753 |
| 2015/0156183 A1* | 6/2015 | Beyer | H04L 63/08 |
| | | | 726/4 |
| 2015/0163182 A1* | 6/2015 | Chandrasekaran | ......... |
| | | | H04L 63/0227 |
| | | | 709/204 |
| 2015/0227941 A1* | 8/2015 | Tuchman | G06Q 30/016 |
| | | | 705/7.14 |
| 2016/0380927 A1 | 12/2016 | Vaughn et al. | |
| 2017/0048170 A1* | 2/2017 | Smullen | H04L 67/02 |
| 2017/0251013 A1* | 8/2017 | Kirti | H04L 63/1441 |
| 2018/0007206 A1* | 1/2018 | Klein | H04L 12/1827 |

OTHER PUBLICATIONS

Extended European Search Report issued in corresponding European Applicaton No. 18810065.5, dated Feb. 18, 2020.

* cited by examiner

FIG.4

| SENSITIVE INFORMATION | CATEGORY |
|:---:|:---:|
| ○○ HOSPITAL | DISEASE |
| △△ DIALYSIS | DISEASE |
| TOKYO | LOCATION |
| YOKOHAMA | LOCATION |
| SON | ACQUAINTANCE |
| TARO YAMADA | ACQUAINTANCE |
| ⋮ | ⋮ |

FIG.5

| CATEGORY | KEYWORD EXAMPLE | | | |
|---|---|---|---|---|
| DISEASE | BODY SITE | DISEASE NAME | DRUG | FACILITY NAME |
| | HEART, FOOT, HAND | HEART DISEASE, PSYCHIATRIC DISEASE, TUBERCULOSIS | ANTIDEPRESSANT, INSULIN | ○○ HOSPITAL, △△ FACILITY |
| LOCATION | GEOGRAPHICAL NAME | GPS INFORMATION | NETWORK INFORMATION | OTHER |
| | TOKYO, SHIBUYA | LOCATION COORDINATES | IP ADDRESS, MAC ADDRESS | ADDRESS, POSTAL CODE |
| ACQUAINTANCE | ADDRESS INFORMATION | SNS INFORMATION | PRONOUN | |
| | MAIL ADDRESS | FRIEND INFORMATION | PERSONAL NAME, ETC. | |

FIG.8A

| CATEGORY | FILTER TYPE |
|---|---|
| DISEASE | A |
| LOCATION | A |
| ACQUAINTANCE | C |
| ⋮ | ⋮ |

FIG.8B

| CATEGORY | FILTER TYPE |
|---|---|
| DISEASE | C |
| LOCATION | C |
| ACQUAINTANCE | A |
| ⋮ | ⋮ |

FIG.8C

| CATEGORY | FILTER TYPE |
|---|---|
| DISEASE | A |
| LOCATION | A |
| ACQUAINTANCE | C |
| ⋮ | ⋮ |

FIG.9A

| CATEGORY | FILTER TYPE |
|----------|-------------|
| DISEASE  | A           |
| LOCATION | A           |
| OTHER    | B           |

FIG.9B

| CATEGORY     | FILTER TYPE |
|--------------|-------------|
| DISEASE      | A           |
| LOCATION     | A           |
| ACQUAINTANCE | NONE        |
| OTHER        | B           |

DATA TRANSFER METHOD AND RECORDING MEDIUM

CROSS-REFERENCE TO RELATED APPLICATIONS

This application is the U.S. National Phase under 35 U.S.C. § 371 of International Application No. PCT/JP2018/017990, filed on May 9, 2018, which claims the benefit of Japanese Application No. 2017-105476, filed on May 29, 2017, the entire contents of each are hereby incorporated by reference.

TECHNICAL FIELD

The present invention relates to a data processing technology and, more particularly, to a data transfer method and a computer program.

BACKGROUND ART

Nowadays everyone is in possession of an information terminal such as a smartphone. In this background, a chat service that allows remote users to exchange messages in real time is provided. A bot that autonomously generate a response message to a message originated by the user and return the response message (hereinafter, referred to as "chat bot") may join a chat.

PATENT LITERATURE

[Patent Literature 1] JP2009-3533

SUMMARY OF INVENTION

Technical Problem

In a chat system that provides a chat service, it is important for users joining a chat to originate messages actively. If, however, there is a concern that personal information included in a message originated by a user may be leaked contrary to the user's intention, users may become reluctant to originate messages.

The disclosure addresses the above-described issue, and a purpose thereof is to realize a chat system that prohibits leakage of personal information not intended by the user.

Solution to Problem

The data transfer method according to one embodiment of the disclosure is a data transfer method for a chat system adapted to transfer chat data transmitted from a user device to another device via a network, wherein, when the chat data transmitted from the user device is detected to include a content related to personal information, a predetermined filtering process is performed on the chat data.

Optional combinations of the aforementioned constituting elements, and implementations of the invention in the form of methods, computer programs, recording mediums encoded with computer programs, etc. may also be practiced as additional modes of the present invention.

Advantageous Effects of Invention

According to the disclosure, a chat system that prohibits leakage of personal information not intended by the user is realized.

BRIEF DESCRIPTION OF DRAWINGS

FIG. 4 shows an example of data stored in the sensitive information storage unit;

FIG. 5 shows an example of sensitive information;

FIGS. 8A, 8B, and 8C show examples of the filtering rule;

FIGS. 9A and 9B also show examples of the filtering rule; and

DESCRIPTION OF EMBODIMENTS

Figure 1:
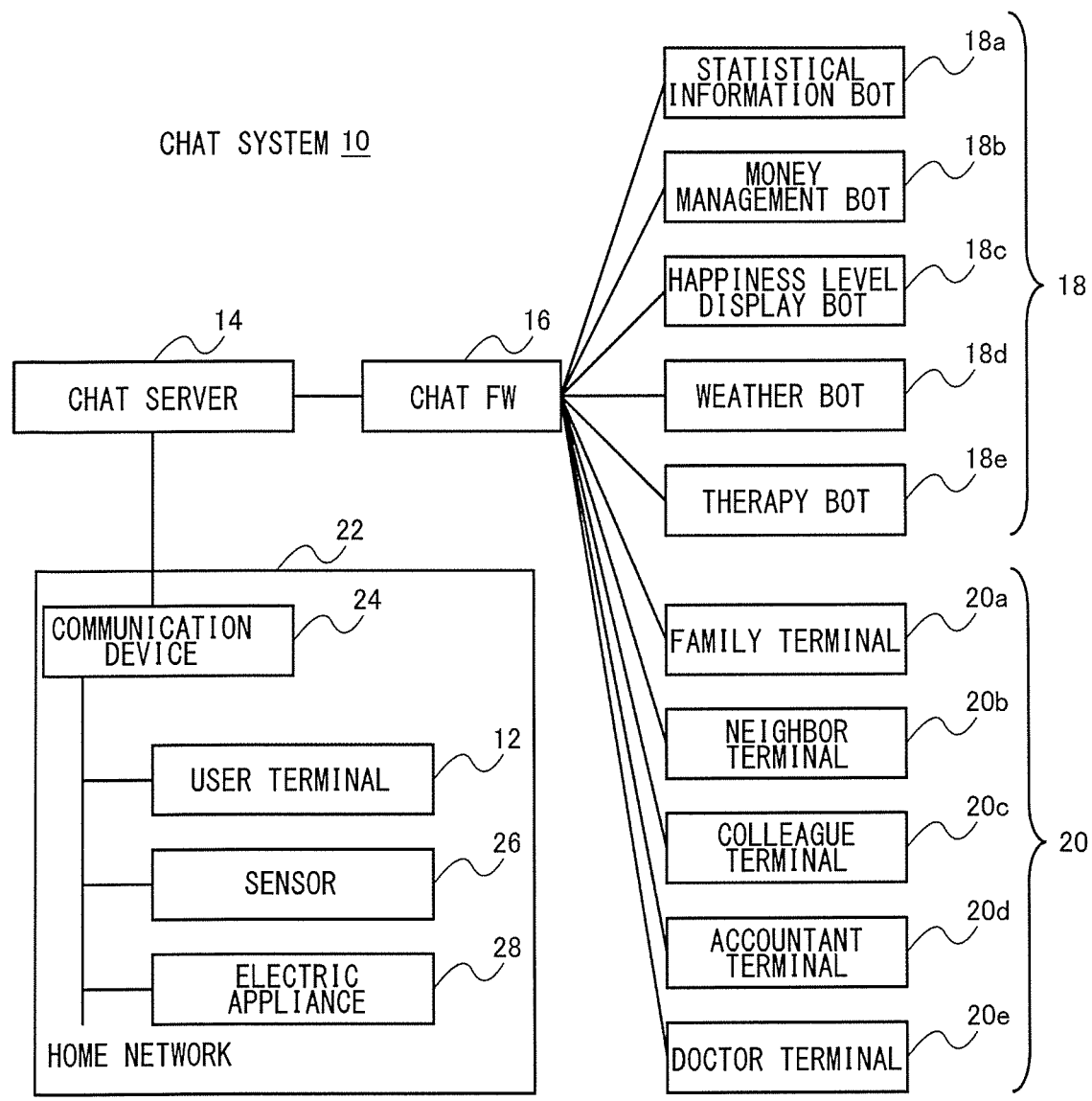
FIG. 1 shows a configuration of a chat system according to the first embodiment.

The device, the system, or the entity that executes the method according to the disclosure is provided with a computer. By causing the computer to run a program, the function of the device, the system, or the entity that executes the method according to the disclosure is realized. The computer is comprised of a processor that operates in accordance with the program as a main hardware feature. The disclosure is non-limiting as to the type of the processor so long as the function is realized by running the program. The processor is comprised of one or a plurality of electronic circuits including a semiconductor integrated circuit (IC) or a large-scale integration (LSI). The plurality of electronic circuits may be integrated in one chip or provided in a plurality of chips. The plurality of chips may be aggregated in one device or provided in a plurality of devices. The program is recorded in a non-transitory recording medium such as a computer-readable ROM, optical disk, and hard disk drive. The program may be stored in a recording medium in advance or supplied to a recording medium via wide area communication network including the Internet.

A brief summary will be given before describing the configuration of the embodiment. Nowadays, a large number of chat services are provided. For the purpose of gaining a large number of users in one's chat service, it is important to provide an environment in which users can feel at ease in offering information. In this background, a chat system that prohibits leakage of personal information not intended by the user is proposed in the first embodiment and the second embodiment.

More specifically, when the chat data transmitted from a user device includes a content related to the personal information on the user, the chat system according to the first embodiment performs a predetermined filtering process on the chat data. Further, the chat system according to the second embodiment autonomously adjusts the rule for the filtering process on the chat data in accordance with the information handling policy of the chat bot at the destination of the chat data.

The personal information includes (1) general information such as IDs, (2) information related to physical characteristics, (3) sensitive information. Sensitive information is information that should be handled extremely carefully and kept secret to others without the permission of the user.

The sensitive information can be said to be privacy information. For example, sensitive information includes information related to the disease of the user, information related to the position where the user is located, and information indicating an acquaintance of the user. In the first embodiment and the second embodiment, the filtering process is performed on the sensitive information, but the technology described in these embodiments is applicable to personal information in general. Personal information and sensitive information need not be limited to text data and may be audio data or image data.

First Embodiment

FIG. 1 shows a configuration of a chat system 10 according to the first embodiment. The chat system 10 is an information processing system for transferring chat data transmitted from a device of a user to another device via a network. The chat data transmitted from a user terminal 12 may include a sentence of a conversation created by the user or include a message that the user communicates to another user or a chat bot. The chat data according to the embodiment could include sensitive information on the user.

The chat system 10 includes a user terminal 12, a chat server 14, a chat fire wall (FW) 16, a plurality of chat bots 18, and a plurality of other user terminals 20. These devices communicate via a local area network (LAN), a wide area network (WAN), the Internet, etc.

The user terminal 12 is an information terminal used by a user using the chat service. The user terminal 12 may be a smartphone, a tablet terminal, or a PC. The user terminal 12 may run a client application for chat to communicate with the chat server 14 by using the function of the application. The term "user" hereinafter means an operator of the user terminal 12 unless otherwise specified.

The user terminal 12 according to the embodiment is connected to a home network 22 provided at the home of the user. The user terminal 12 communicates with a device of an external network (e.g., the chat server 14, the chat FW 16, the chat bot 18, the other user terminal 20) via the home network 22. A communication device 24 (e.g., a broadband router, switch, etc.) communicating with a device of the external network is provided in the home network 22. The user terminal 12, a sensor 26, and an electric appliance 28 are connected to the communication device 24.

The chat server 14 is an information processing device for running a server application for chat. The chat server 14 manages a chat session (which can also be referred to as a chat room) between the user terminal 12 and the chat bot 18 and/or a chat session between the user terminal 12 and the other user terminal 20.

The chat server 14 transfers the chat data transmitted from the user terminal 12 to one or more chat bots 18 or other user terminals 20 designated by the chat data. The chat server 14 also transfers, to the user terminal 12, the chat data transmitted from the chat bot 18 or the other user terminal 20 and destined to the user terminal 12.

The chat FW 16 is an information processing device that performs, when the chat data transmitted from the user terminal 12 includes a content related to personal information, a predetermined filtering process on the chat data. Specific functions of the chat FW 16 will be described later. In the chat system 10 according to the embodiment, the chat FW 16 is provided as a device separate from the chat server 14. In one variation, the function of the chat server 14 and the function of the chat FW 16 may be implemented in the same housing. For example, the chat server 14 may be configured to be provided with the function of the chat FW 16.

The chat bot 18 is an information processing device in which is installed a bot application that autonomously generates chat data transmitted to the user terminal 12 based on the chat data transmitted from the user terminal 12 and transferred by the chat server 14. The bot application may generate a response message for the chat data transmitted from the user terminal 12, based on any of various algorithms or artificial intelligence. The response message generated by the chat bot 18 is transmitted to the user terminal 12 via the chat server 14 and presented to the user.

A plurality of chat bots 18 include a publicly known chat bot. The plurality of chat bots 18 according to the embodiment include a statistical information bot 18a, a money management bot 18b, a happiness level display bot 18c, a weather bot 18d, and a therapy bot 18e. For example, the statistical information bot 18a transmits, to the user terminal 12, statistical information related to a predetermined keyword included in the chat data transmitted from the user terminal 12, as the response message. The money management bot 18b transmits, to the user terminal 12, asset management information related to a predetermined keyword included in the chat data transmitted from the user terminal 12, as the response message.

The happiness level display bot 18c estimates the user's happiness level based on the content of the chat data transmitted from the user terminal 12 and transmits the result of estimation to the user terminal 12 as the response message. The weather bot 18d transmits, to the user terminal 12, weather information related to a predetermined keyword included in the chat data transmitted from the user terminal 12, as the response message. The therapy bot 18e generates a therapy message based on the content of the chat data transmitted from the user terminal 12 and transmits the message to the user terminal 12 as the response message.

The other user terminal 20 is an information processing terminal operated by another user different from the user operating the user terminal 12. The other user terminal 20 may be a smartphone, a tablet terminal, or a PC. The plurality of user terminals 20 include a family terminal 20a operated by a family member of the user, a neighborhood terminal 20b operated by a neighbor of the user, and a colleague terminal 20c operated by a colleague of the user. The plurality of other user terminals 20 also include an accountant terminal 20d operated by an accountant and a doctor terminal 20e operated by a doctor.

Figure 2:
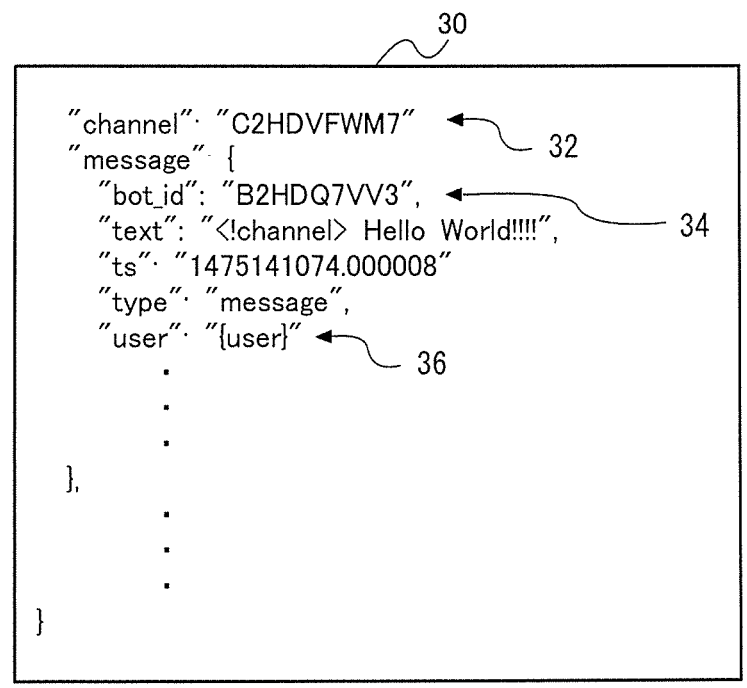
FIG. 2 shows an example of chat data according to the first embodiment.

FIG. 2 shows an example of chat data according to the first embodiment. Chat data 30 includes a channel ID 32 and a bot ID 34 indicating the destination of transmission of the chat data. The channel ID 32 is an ID for identifying the other user terminal 20 among the plurality of other user terminals 20 to which the chat data is destined. One channel ID 32 may designate a plurality of other user terminals 20. The bot ID 34 is an ID for identifying chat bot 18 among the plurality of chat bots 18 to which the chat data is destined. The chat data 30 further includes a user ID 36 indicating the source of transmission of the chat data.

Figure 3:
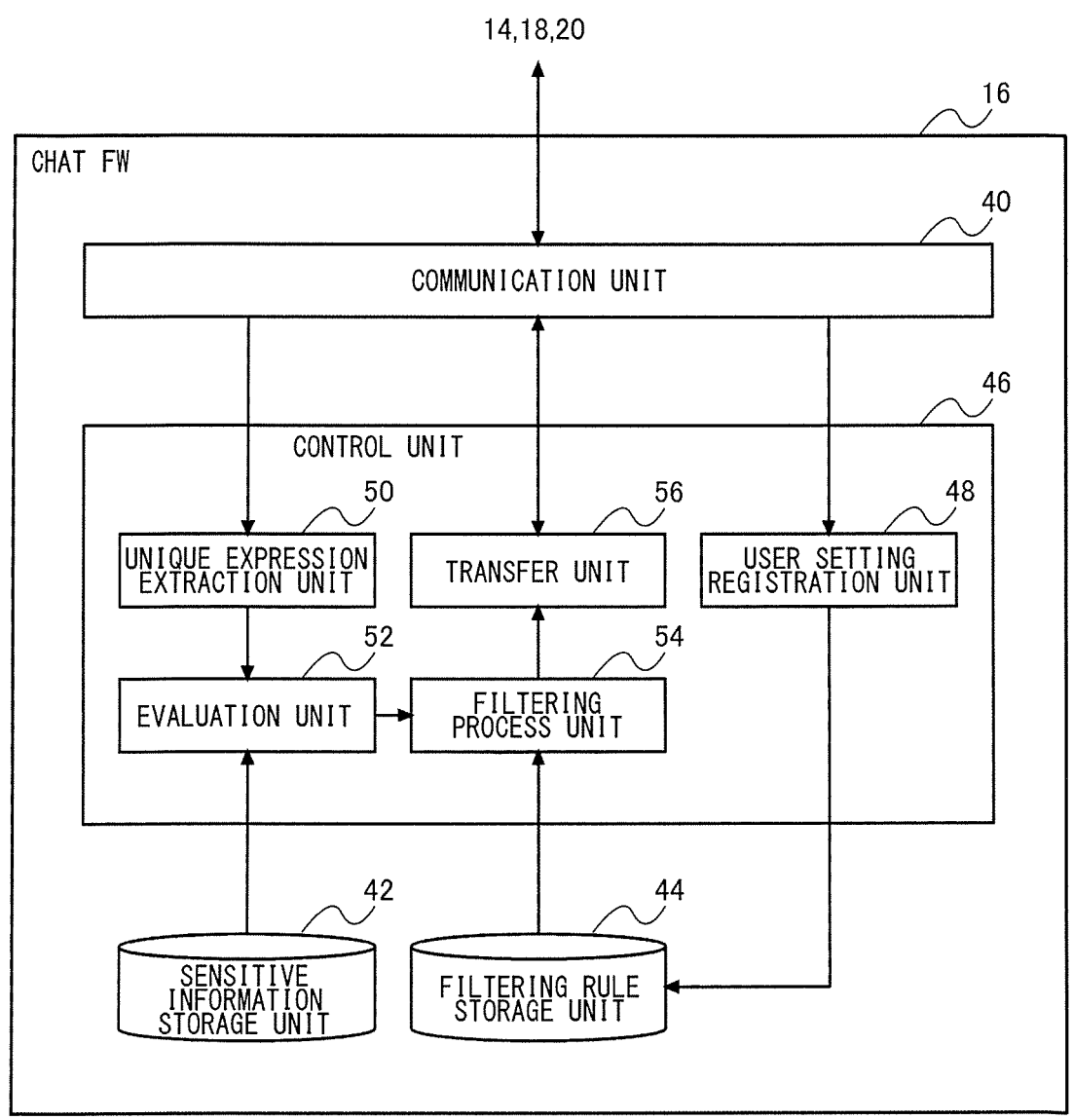
FIG. 3 is a block diagram showing functions and a configuration of the chat FW of FIG. 1.

FIG. 3 is a block diagram showing functions and a configuration of the chat FW 16 of FIG. 1. The chat FW 16 includes a communication unit 40, a sensitive information storage unit 42, a filtering rule storage unit 44, and a control unit 46. The blocks depicted in the block diagram of this specification are implemented in hardware such as elements or mechanical devices such as a CPU and a memory of a computer, and in software such as a computer program. FIG.

2 depicts functional blocks implemented by the cooperation of these elements. Therefore, it will be understood by those skilled in the art that these functional blocks may be implemented in a variety of manners by a combination of hardware and software.

The communication unit 40 communicates with an external device in accordance with a predetermined communication protocol. For example, the communication unit 40 communicates with the chat server 14, the chat bot 18, and the other user terminal 20. The communication unit 40 receives user setting information and chat data transmitted from the user terminal 12 (or transmitted from the user terminal 12 and transferred by the chat server 14). Further, the communication unit 40 transmits the chat data output from the control unit 46 to at least one of: the user terminal 12; the chat server 14; the chat FW 16; and the chat bot 18, in accordance with the destination.

The sensitive information storage unit 42 stores sensitive information applied commonly to a plurality of users. For example, the sensitive information storage unit 42 stores sensitive information predefined by the manager of the chat FW 16 or the provider of the chat service. It should be noted that the sensitive information storage unit 42 may further store sensitive information registered from the user terminal 12 and defined by the user.

FIG. 4 shows an example of data stored in the sensitive information storage unit 42. The sensitive information storage unit 42 stores a plurality of pairs of sensitive information and a category (i.e., the type of information). FIG. 5 shows an example of sensitive information. The categories of sensitive information include disease, location, and acquaintance. The upper row in the "key word example" field shows an example of information item, and the bottom row shows a specific example of sensitive information.

Referring back to FIG. 3, the filtering rule storage unit 44 stores a rule of filtering the chat data transmitted from the user terminal 12 (hereinafter, also referred to as "filtering rule"). The filtering rule according to the embodiment represents data that defines which of the three types of filtering processes described later is applied to one chat bot 18 or to each of the other user terminals 20. It is possible to define no-filtering for a particular chat bot 18 or other user terminal 12, i.e., to define transferring chat data including sensitive information directly.

A description will now be given of three types of filtering processes.

1. Filtering process A (high security level): sentences that include sensitive information are not transferred.

For example, filtering process A may prohibit transfer of the entirety of chat data including a plurality of sentences transmitted from the user terminal 12. Alternatively, filtering process A may prohibit transfer of sentences, of a plurality of sentences included in the chat data transmitted from the user terminal 12, that include sensitive information but may permit transfer of sentences that do not include sensitive information.

2. Filtering process B (medium security level): sensitive information is encrypted and transferred.

The encryption scheme may be a common key system or a public key system. For example, when the user terminal 12 registers a particular chat bot 18 or other user terminal 20 as a destination device in a chat, the chat server 14 or the chat FW 16 may provide a common key predefined for encryption to the destination device.

3. Filtering process C (medium security level): sensitive information is anonymized and transferred.

Filtering process C may delete a character string in the chat data that indicates sensitive information. Alternatively, filtering process C may replace a character string of sensitive information included in the chat data by a common (i.e., generalized) character string. For example, "Shibuya" may be replaced by "Tokyo", "somewhere", etc. Still alternatively, filtering process C may replace a character string of sensitive information included in the chat data by pseudo data or similar data. For example, "Tokyo" may be replaced by "Osaka". Still alternatively, filtering process C may add noise information to a character string of sensitive information included in the chat data. For example, a noise character string for making it difficult to identify sensitive information may be added.

Thus, by setting no-filtering or one of filtering processes A-C for each destination device in a chat, the chat data including sensitive information can be transferred only to a destination device, of a plurality of destination devices, for which transmission of sensitive information is permitted. In other words, spreading of sensitive information contrary to the user's intention is prohibited.

The control unit 46 performs various data processes for filtering sensitive information included in the chat data. The control unit 46 includes a user setting registration unit 48, a unique expression extraction unit 50, an evaluation unit 52, a filtering process unit 54, and a transfer unit 56.

A computer program including a plurality of modules corresponding to a plurality of blocks in the control unit 46 may be stored in a recording medium and installed in the storage of the chat FW 16 via the recording medium. Alternatively, the computer program may be installed in the storage of the chat FW 16 via a network. The CPU of the chat FW 16 may exhibit the functions of the blocks by reading the computer program from the storage and running the program.

The user setting registration unit 48 acquires the user setting information received by the communication unit 40. The user setting information includes a filtering rule that the user registers in the chat FW 16. The filtering rule may, for example, include a plurality of combinations of a destination device in a chat and a filter type (one of A-C). The user setting registration unit 48 stores the filtering rule indicated by the user setting information as being a subject of registration in the filtering rule storage unit 44. In one variation, the user setting information may include sensitive information that the user registers in the chat FW 16. The user setting registration unit 48 may store the sensitive information indicated by the user setting information as being a subject of registration in the sensitive information storage unit 42.

The control unit 46 refers to the filtering rule storage unit 44 to identify which of no-filtering and one of filtering processes A-C is set for the destination device indicated by the chat data received by the communication unit 40. In the case one of filtering processes A-C is set, the chat data is input to the unique expression extraction unit 50. In the case no-filtering is set, the chat data is input to the transfer unit 56.

In the case a pronoun such as a personal name and a geographical name, a date expression, and a time expression (hereinafter, generically referred to as "unique expression") is found in the chat data, the unique expression extraction unit 50 extracts a character string of the unique expression by using a publicly known method. The publicly known method may, for example, include morphological analysis.

The evaluation unit 52 refers to the sensitive information stored in the sensitive information storage unit 42 and determines whether the sensitive information is included in one or more unique expression character strings extracted by the unique expression extraction unit 50. In other words, in the case any of the unique expression character strings in the chat data corresponds to the sensitive information, the evaluation unit 52 detects the character string.

In the case the evaluation unit determines that the sensitive information is included in any of the unique expression character strings in the chat data, the filtering process unit 54 identifies the chat data as chat data subject to filtering. The filtering process unit 54 refers to the filtering rule storage unit 44 and identifies the filtering rule set for the destination device indicated by the chat data. In the embodiment, no-filtering or one of filtering processes A-C is identified as the filtering rule.

More specifically, in the case that filtering process A is set for the destination device indicated by the chat data subject to filtering, the filtering process unit 54 prohibits transfer of the chat data subject to filtering. For example, the filtering process unit 54 may discard the chat data subject to filtering without transferring the data.

In the case filtering process B is set for the destination device indicated by the chat data subject to filtering, the filtering process unit 54 encrypts the sensitive information character string included in the chat data subject to filtering by using a common key. The entirety of the chat data subject to filtering may be encrypted. In the case of applying a public key system, the filtering process unit 54 in one variation may encrypt the sensitive information character string or the entirety of the chat data subject to filtering by using a public key of the destination device. The filtering process unit 54 outputs the chat data in which the sensitive information character string is encrypted to the transfer unit 56.

In the case filtering process C is set for the destination device indicated by the chat data subject to filtering, the filtering process unit 54 replaces the sensitive information character string included in the chat data subject to filtering by a character string that anonymizes the sensitive information. For example, the filtering process unit 54 may maintain a table that maps a plurality of sensitive information character strings to a plurality of anonymized character strings and replace the sensitive information character string by the anonymized character string in accordance with the table. The filtering process unit 54 outputs the chat data in which the sensitive information is anonymized to the transfer unit 56.

The transfer unit 56 transmits the chat data output from the filtering process unit 54 to the destination device indicated by the chat data. Further, the transfer unit 56 transmits, of the chat data received by the communication unit 40, the chat data in which the destination device is set to no-filtering to the destination device.

Figure 6:
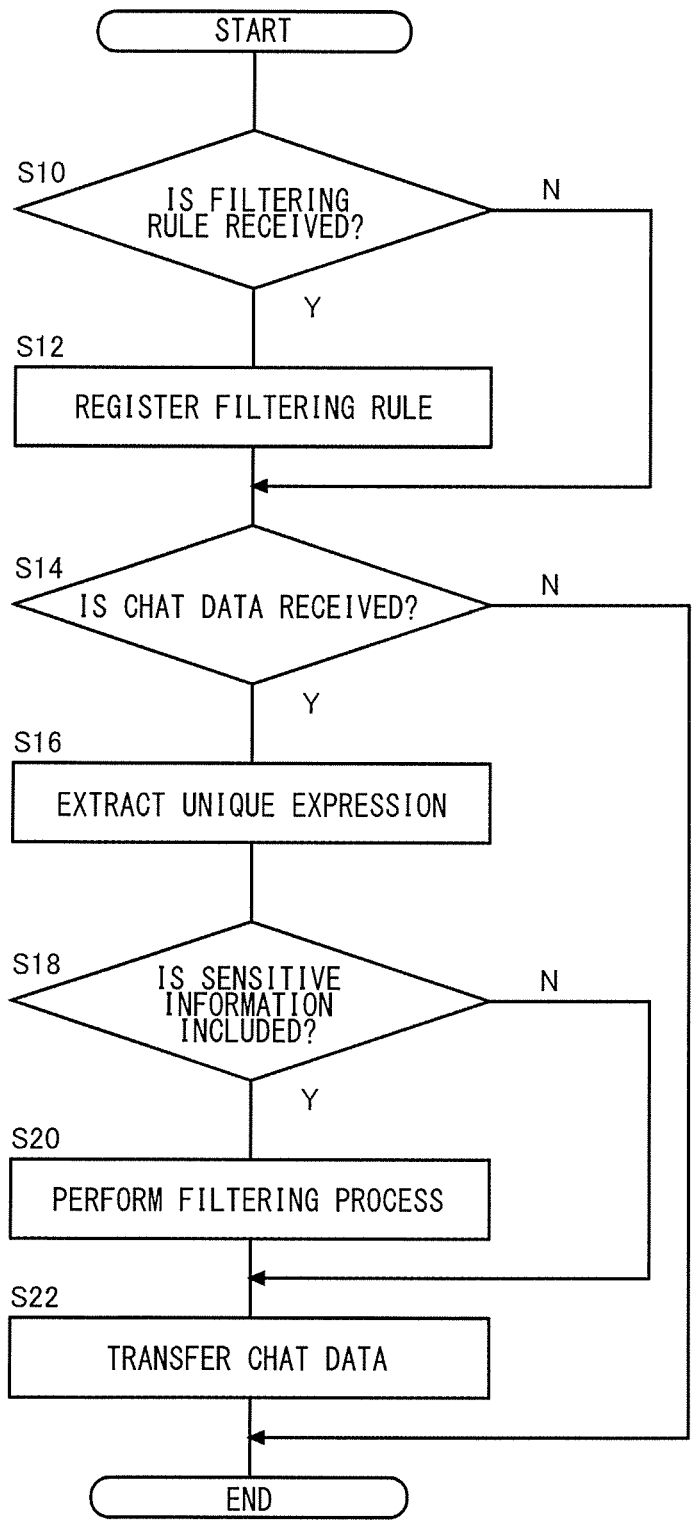
FIG. 6, which is a flowchart showing the operation of the chat FW according to the first embodiment.

A description will now be given of the operation of the chat system 10 configured as described above. The operation will be described below with reference to FIG. 6, which is a flowchart showing the operation of the chat FW 16 according to the first embodiment.

The user terminal 12 transmits user setting information designating one of a plurality of chat bots 18 or one of a plurality of other user terminals 20 as a destination device in a chat, and designating a filtering process rule for the destination device to the chat FW 16, in accordance with the user operation. When the communication unit 40 of the chat FW 16 receives the user setting information transmitted from the user terminal 12 (Y in S10), the user setting registration unit 48 stores the filtering process rule indicated by the user setting information in the filtering rule storage unit 44, mapping the rule to the user (S12). If the chat FW 16 has not received the user setting information (N in S10), S12 is skipped.

The user terminal 12 transmits chat data including a character string input by the user to the chat server 14. The chat server 14 receives the chat data transmitted from the user terminal 12 and transfers the chat data to the destination device (e.g., a particular chat bot 18 or other user terminal 20) designated by the chat data.

The chat system 10 according to the first embodiment performs a filtering process on the chat data after the chat server 14 has transferred the chat data transmitted from the user terminal 12 and before the chat bot 18 or the other user terminal 20 receives the chat data. Further, the chat system 10 according to the first embodiment transfers the chat data including the sensitive information only to the device, of a plurality of devices (i.e., a plurality of chat bots 18 and other user terminals 20) that can be a destination in a chat, for which transfer of sensitive information is permitted. The filtering process and the transfer process are performed by the chat FW 16 placed between the chat server 14 and the chat bot 18 or the other user terminal 20.

More specifically, when the communication unit 40 of the chat FW 16 receives the chat data transmitted from the user terminal 12 and transferred by the chat server 14 (Y in S14), the unique expression extraction unit 50 extracts a plurality of unique expression character strings from the chat data (S16). The evaluation unit 52 determines whether sensitive information is included in each unique expression character string extracted. In the case sensitive information is included in at least one unique expression character string (Y in S18), the filtering process unit 54 performs a filtering process on the chat data in accordance with the filtering rule mapped to the destination device designated by the chat data (S20).

The transfer unit 56 of the chat FW 16 transmits the chat data that does not include sensitive information in the first place or the chat data subjected to a filtering process by the filtering process unit 54 to the destination device designated by the chat data (S22). If sensitive information is not included in the unique expression character string extracted in S16 (N in S18), S20 is skipped. If the chat FW 16 has not received chat data (N in S14), S16 and the subsequent steps are skipped.

In the case the destination device designated by the chat data received by the communication unit 40 is mapped to no-filtering, the steps S16-S20 are skipped. In other words, a filtering process is not performed regardless of whether the chat data includes sensitive information. The transfer unit 56 transmits the chat data not subjected to a filtering process to the destination device.

According to the chat system 10 of the first embodiment, the filtering process is performed on the chat data based on the filtering rule designated by the user in advance. This can prohibit leakage or spreading of sensitive information not intended by the user. Further, performing a filtering process before the chat bot 18 or the other user terminal 12 receives the chat data makes it more certain that the sensitive information on the user is kept secret to the chat bot 18 or the other user terminal 20.

An ID indicating a group that a plurality of destination devices join may be designated as a channel ID in one chat data item transmitted from the user terminal 12. In this case, the chat server 14 transmits a plurality of chat data items to the plurality of destination devices, based on one chat data item transmitted from the user terminal 12. The chat FW 16 performs the steps S14-S22 multiple times in accordance with the plurality of chat data items received from the chat server 14. In other words, the chat FW 16 individually performs a filtering process adapted to the destination of each of the plurality of chat data items.

Described above is an explanation based on the first embodiment. The first embodiment is intended to be illustrative only and it will be understood by those skilled in the art that various modifications to constituting elements and processes could be developed and that such modifications are also within the scope of the present invention.

The chat system 10 according to the above embodiment filters sensitive information after the chat data transmitted from the user terminal 12 is transferred by the chat server 14 and before it is received by the chat bot 18 or the other user terminal 20. In one variation, the chat system 10 may filter sensitive information before the chat server 14 receives the chat data transmitted from the user terminal 12.

In this variation, the chat FW 16 may be placed between the user terminal 12 and the chat server 14. Alternatively, the chat FW 16 may be placed between the communication device 24 and the chat server 14 and at a position in the home network 22 that borders the Internet. In this variation, too, the chat FW 16 may perform, in the case the chat data includes sensitive information, a filtering process (e.g., one of A-C above) on the sensitive information, based on the filtering rule mapped to the destination device of the chat data.

In further accordance with the chat system 10 of the above embodiment, the filtering rule is defined for each destination device (a particular chat bot 18 or other user terminal 20) to which the chat data is transmitted. In one variation, the filtering rule may be defined for each category of sensitive information (disease, location, acquaintance, etc.) instead of for the destination device to which the chat data is transmitted. Alternatively, the filtering rule may be defined for each combination of the destination device to which the chat data is transmitted and a category of sensitive information. For example, the filtering rule may be defined for a combination (the statistical information bot 18*a*, disease), a combination (the statistical information bot 18*a*, location), and a combination (the money management bot 18*b*, location).

The technologies according to the first embodiment and variations may be defined by the following items.

[Item 1-1]

A data transfer method for a chat system (10) adapted to transfer chat data transmitted from a user device (12) to another device (18, 20) via a network, wherein, when the chat data transmitted from the user device (12) is detected to include a content related to personal information, a predetermined filtering process is performed on the chat data.

[Item 1-2]

The data transfer method according to item 1-1, wherein the chat system (10) includes a chat server (14) that transmits and receives chat data to and from the user device (12), and a bot (18) that autonomously generates chat data transmitted to the user device (12) based on the chat data transmitted from the user device (12) and transferred by the chat server (14), and the filtering process is performed before the chat server (14) receives the chat data transmitted from the user device (12).

[Item 1-3]

The data transfer method according to item 1-1, wherein the chat system (10) includes a chat server (14) that transmits and receives chat data to and from the user device (12), and a bot (18) that autonomously generates chat data transmitted to the user device (12) based on the chat data transmitted from the user device (12) and transferred by the chat server (14), and the filtering process is performed before the bot (18) receives the chat data transmitted from the user device (12).

[Item 1-4]

The data transfer method according to item 1-3, wherein the chat system (10) includes a plurality of bots (18) that autonomously generate chat data of different types, and the chat data including the content related to personal information is transferred only to the bot (18), of the plurality of bots (18), for which transfer of the content related to personal information is permitted.

[Item 1-5]

A computer program that causes a chat system (10), adapted to transfer chat data transmitted from a user device (12) to another device via a network, to perform a predetermined filtering process on the chat data transmitted from the user device (12) when the chat data is detected to include a content related to personal information.

Second Embodiment

While prevention of leakage of personal information (sensitive information) is important, a conversation between the user and the chat bot may not be established if the information provided to the chat bot is excessively restricted. It will be noted that some chat bots provide information indicating the mode of use, scope of use, scope of disclosure, etc. of information acquired from an external device (hereinafter, referred to as "information handling policy") to an external device or a user and ask for consent to the information handling policy. It can be said that information handling policy is information protection policy or privacy policy.

In the case the information handling policy provided by the chat bot defines the use of particular personal information, the chat system 10 according to the second embodiment sets a relatively strict filtering rule for the particular personal information. Meanwhile, in the case the information handling policy provided by the chat bot defines restriction of use, non-use, non-disclosure, etc. of particular personal information, the chat system 10 according to the second embodiment sets a relatively loose filtering rule for the particular personal information. A relatively strict filtering rule may be, for example, filtering process A described above. A relatively loose filtering rule may be, for example, filtering process C described above.

More specifically, the filtering rule is designated in units of categories of sensitive information in the second embodiment. The chat system 10 according to the second embodiment autonomously adjusts the filtering rule designated by the user in accordance with the information handling policy predefined in the chat bot. The constituting elements of the chat system 10 according to the second embodiment are the same as those of the first embodiment (FIG. 1). The details already described in the first embodiment are omitted as appropriate and the difference from the first embodiment will mainly be described.

Figure 7:
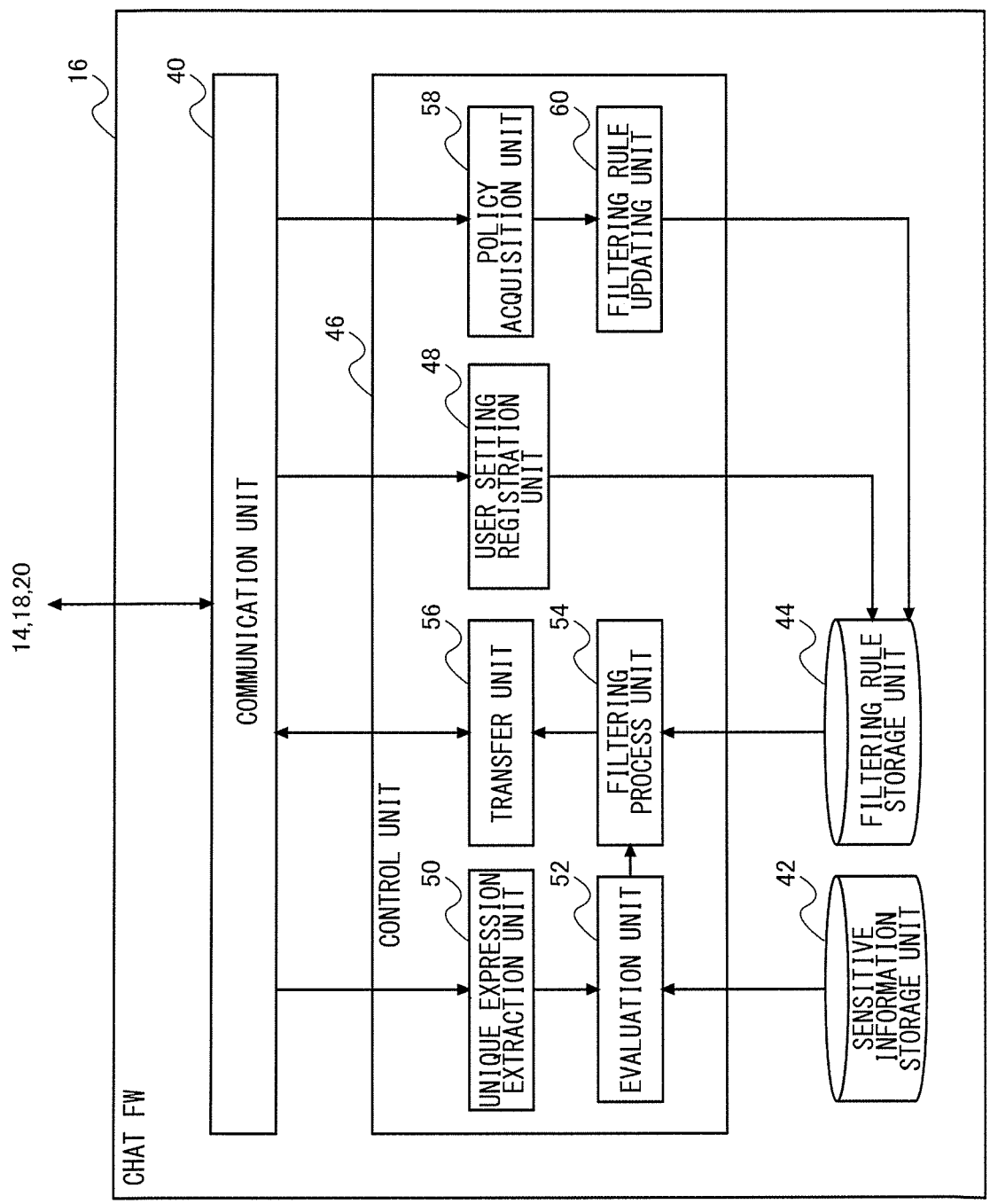
FIG. 7 is a block diagram showing functions and a configuration of the chat FW according to the second embodiment.

FIG. 7 is a block diagram showing functions and a configuration of the chat FW 16 according to the second embodiment. The chat FW 16 according to the second embodiment includes a policy acquisition unit 58 and a filtering rule updating unit 60 in addition to the function blocks of the first embodiment.

The communication unit 40 of the chat FW 16 receives the filtering rule transmitted from the user terminal 12 and designated by the user in units of categories of sensitive information. The user setting registration unit 48 stores the filtering rule transmitted from the user terminal 12 in the filtering rule storage unit 44, defining it as a default filtering rule and mapping the rule to the user.

In the second embodiment, the user selects the chat bot 18 to chat with, from among the plurality of chat bots 18 (e.g., the statistical information bot 18*a*-the therapy bot 18*e*), and registers the selected chat bot in the chat FW 16. The user terminal 12 transmits the identification information on the chat bot 18 selected by the user to the chat FW 16 or the chat server 14. In the case the identification information on the chat bot 18 is transmitted from the user terminal 12 to the chat server 14, the chat server 14 transfers the identification information on the chat bot 18 to the chat FW 16.

When identification information on the chat bot 18 selected by the user (hereinafter, also referred to as "selected bot") is received, the policy acquisition unit 58 acquires the information handling policy predefined in the selected bot from an external device. For example, the policy acquisition unit 58 may access the selected bot via a network and acquire the information handling policy stored in the selected bot.

The filtering rule updating unit 60 generates a filtering rule applied to the chat data transmitted to the selected bot, by adjusting the user's default filtering rule in accordance with the information handling policy of the selected bot 18 acquired by the policy acquisition unit 58. The filtering rule updating unit 60 stores the filtering rule for the selected bot in the filtering rule storage unit 44, mapping the rule to the ID of the user and the ID of the selected bot.

Subsequently, the filtering process unit 54 applies the filtering rule for the selected bot to filter the chat data transmitted from the user terminal 12 and destined to the selected bot. For example, the filtering process unit 54 filters the sensitive information of a given category included in the chat data, performing a filtering process of a type (e.g., one of A-C) set for the category.

A description will be given of the process of setting the filtering rule for the selected bot. FIGS. 8A, 8B, and 8C show examples of the filtering rule. FIG. 8A shows the user's default filtering rule. The filtering rule shown defines that filtering process A is applied to any sensitive information belonging to disease, location, and acquaintance. In other words, it defines that the chat data including these types of sensitive information is not delivered to the chat bot 18.

By way of the first example, it will be assumed that the information handling policy of the selected bot defines "access the sentence and provide the sentence to a third party". In this case, the filtering rule updating unit 60 determines, through publicly known natural language processing such as morphological analysis, that the content of the information handling policy is abstract, and no restriction is imposed on sentences provided to a third party. As a result, the filtering rule updating unit 60 sets a relatively strict filtering rule for the sensitive information of all categories. For example, the default filtering rule shown in FIG. 8A is strict and defines filter type A for all categories so that the filtering rule updating unit 60 determines that a condition to change the default filtering rule is not met. The filtering rule updating unit 60 stores the default filtering rule as the filtering rule for the selected bot.

By way of the second example, it will be assumed that the information handling policy of the selected bot defines "access the sentence and provide the sentence to a third party (excluding for disease-related sentences and location-related sentences)". In this case, the filtering rule updating unit 60 determines that the information handling policy restricts provision of disease-related sentences and location-related sentences to a third party. As a result, the filtering rule updating unit 60 sets a relatively loose filtering rule for the sensitive information of the disease category and the location category. For example, the filtering rule updating unit 60 determines that a condition to change filter type A is met for the disease category and the location category in the default filtering rule (FIG. 8A). The filtering rule updating unit 60 stores a filtering rule (FIG. 8B), in which the filter type A for the disease category and the location category in the default filtering rule is changed to the filter type C, as the filtering rule for the selected bot.

By way of the third example, it will be assumed that the information handling policy of the selected bot defines "access the sentence and provide the sentence to a third party (deals with disease-related sentences and location-related sentences)". In this case, the filtering rule updating unit 60 sets a relatively strict filtering rule for the sensitive information of the disease category and the location category, and, on the other hand, sets a relatively loose filtering rule for the sensitive information of the other categories. For example, the filtering rule updating unit 60 determines that a condition to change filter type A is met for the acquaintance category in the default filtering rule (FIG. 8A). The filtering rule updating unit 60 stores a filtering rule (FIG. 8C), in which filter type A for the acquaintance category in the default filtering rule is changed to the filter type C, as the filtering rule for the selected bot.

The filtering rule updating unit 60 of the embodiment adjusts the default filtering rule predefined by the user. In one variation, preconfiguration of the default filtering rule may not be necessary. The filtering rule updating unit 60 may generate a filtering rule for the selected bot from scratch in accordance with the information handling policy of the selected bot. For example, the filtering rule updating unit 60 may set a relatively strict filtering rule (e.g., filtering process A) for the category declared to be used in the information handling policy. Meanwhile, the filtering rule updating unit 60 may set a relatively loose filtering rule (e.g., filtering process B or filtering process C) for the category for which the information handling policy defines restriction on the use.

FIGS. 9A and 9B also show examples of the filtering rule. FIG. 9A shows the user's default filtering rule. The filtering rule shown defines applying filtering process A to the sensitive information of the disease category and the location category and collectively applying filtering process B (i.e., encrypting the sensitive information) to the sensitive information of the other categories.

By way of the fourth example, it will be assumed that the information handling policy of the selected bot defines "access the sentence and provide the sentence to a third party" as in the case of the first example. In this case, the filtering rule updating unit 60 determines that the content of the information handling policy is abstract, and no restriction is imposed on sentences provided to a third party. As a result, the filtering rule updating unit 60 stores the default filtering rule shown in FIG. 9A as the filtering rule for the chat bot 18 selected by the user, without loosening the default filtering rule. In one variation, the filtering rule updating unit 60 may store a filtering rule, in which filter type for the sensitive information of the other categories is changed from B to A. In other words, the filtering rule for the selected bot may be stricter than the default.

By way of the fifth example, it will be assumed that the information handling policy of the selected bot defines "access the sentence and provide the sentence to a third party (acquaintance-related sentences are excluded)". In this case, the filtering rule updating unit 60 determines that the information handling policy excludes provision of acquaintance-related sentences to a third party. The filtering rule updating unit 60 sets a filter type looser than the filter type for the sensitive information of the other categories, for the sensitive information of the acquaintance category. For example, the filtering rule updating unit 60 determines that a condition to change filter type B for the acquaintance category is met. As shown in FIG. 9B, the filtering rule updating unit 60 adds a rule of applying no-filtering to the sensitive information of the acquaintance category to the default filtering rule (FIG. 9A).

A description will be given of the operation of the chat FW 16 according to the second embodiment. In the second embodiment, the user's default filtering rule is stored in the filtering rule storage unit 44 in S10, S12 of FIG. 6. Subsequently, the user terminal 12 transmits the identification information on the selected bot selected by the user to the chat FW 16.

Figure 10:
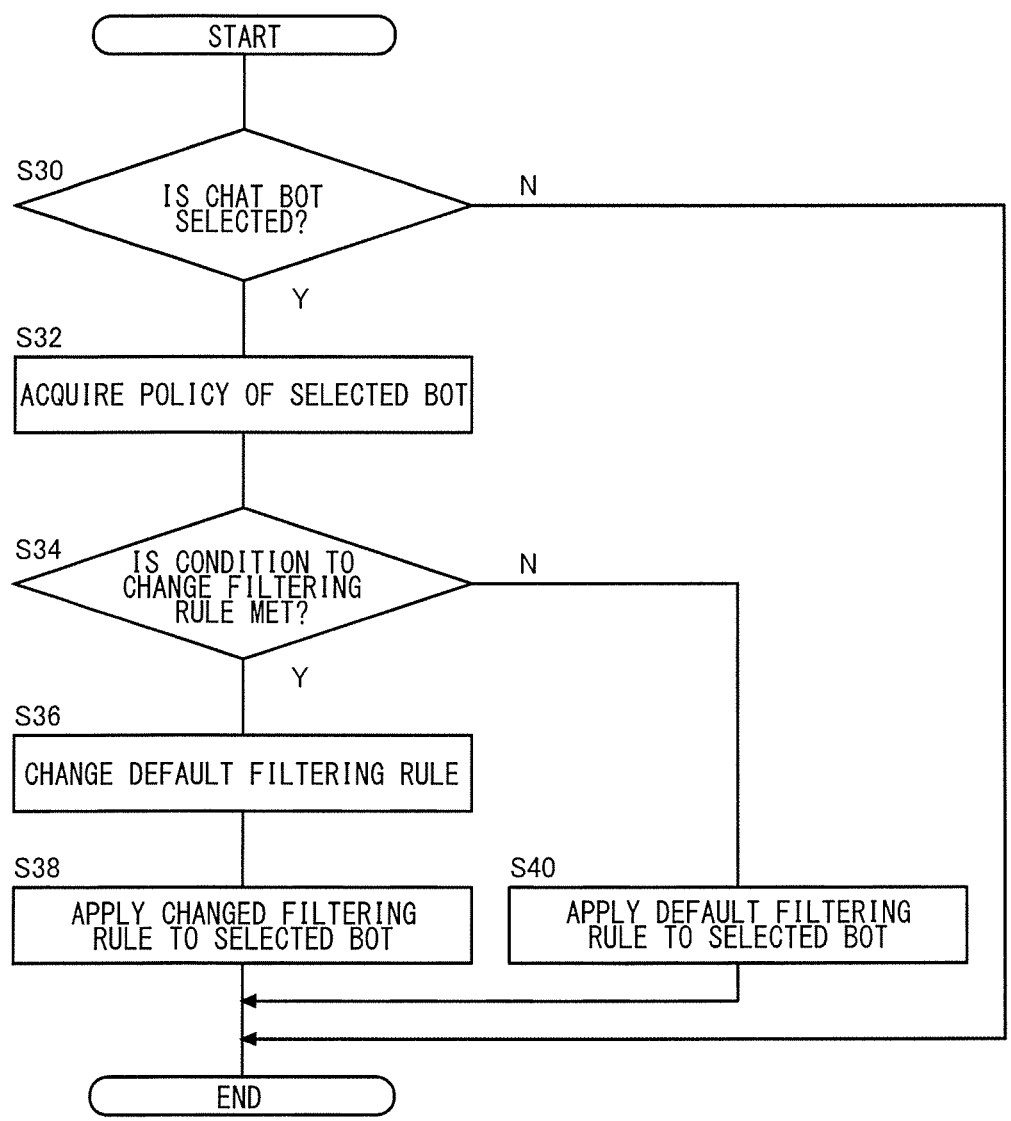
FIG. 10 is a flowchart showing the operation of the chat FW according to the second embodiment.

FIG. 10 is a flowchart showing the operation of the chat FW 16 according to the second embodiment. When the communication unit 40 of the chat FW 16 receives the identification information on the selected bot transmitted from the user terminal 12 (Y in S30), the policy acquisition unit 58 acquires the information handling policy of the selected bot (S32). In the case the information handling policy of the selected bot meets a condition to change the filtering rule (Y in S34), the filtering rule updating unit 60 changes the user's default filtering rule (S36). The filtering rule updating unit 60 stores the filtering rule as changed in the filtering rule storage unit 44 as the filtering rule for the selected bot (S38).

In the case the condition to change the filtering rule is not met (N in S34), the filtering rule updating unit 60 stores the default filtering rule in the filtering rule storage unit 44 as the filtering rule for the selected bot (S40). If the communication unit 40 of the chat FW 16 has not received the identification information on the bot selected by the user (N in S30), S32 and the subsequent steps are skipped, and the illustrated flow is terminated.

According to the chat system 10 of the second embodiment, the filter type for the sensitive information is autonomously adjusted in accordance with the information handling policy of the chat bot 18 that the user chats with. This makes it easy to establish a conversation between the user and the chat bot, while also prohibiting leakage of personal information not intended by the user.

Described above is an explanation based on the second embodiment. The second embodiment is intended to be illustrative only and it will be understood by those skilled in the art that various modifications to constituting elements and processes could be developed and that such modifications are also within the scope of the present invention.

Any combination of the embodiment and a variation will also be useful as an embodiment of the present invention. A new embodiment created by a combination will provide the combined advantages of the embodiment and the variation as combined. It will be understood to a skilled person that the functions that the constituting elements recited in the claims should achieve are implemented either alone or in combination by the constituting elements shown in the embodiments and the variations.

REFERENCE SIGNS LIST

10 chat system, 12 user terminal, 14 chat server, 16 chat FW, 18 chat bot, 20 user terminal, 50 unique expression extraction unit, 52 evaluation unit, 54 filtering process, 56 transfer unit

INDUSTRIAL APPLICABILITY

The present invention is applicable to a device or a system that processes chat data.

The invention claimed is:
1. A data transfer method for a chat system in which a user device communicates with devices via a network, the data transfer method comprising:
   detecting that chat data transmitted to one of the devices from the user device includes a content related to personal information;
   selecting one of filtering processes that is associated with the one of the devices when the chat data is determined to include the content related to personal information, wherein the filtering processes are different from each other; and
   performing the one of the filtering processes on the chat data,
   wherein the filtering processes include:
      a first process that prohibits transferring a content related to personal information;
      a second process that encrypts chat data including a content related to personal information; and
      a third process that replaces a content related to personal information with another content,
   wherein the devices include a first device, a second device, and a third device,
   wherein the data transfer method further includes storing user information and filtering process information associated with the user information in a memory, the filtering process information assigning the first process to the first device; assigning the second process to second device; and assigning the third process to the third device, and
   wherein the selecting one of the filtering processes includes:
      identifying the filtering process information in the memory based on a user included in the chat data;
      selecting the first process when a destination of the chat data is the first device;
      selecting the second process when the destination of the chat data is the second device; and
      selecting the third process when the destination of the chat data is the third device.
2. The data transfer method according to claim 1, wherein the chat system includes a chat server that transmits and receives the chat data to and from the user device, and a bot that autonomously generates chat data transmitted to the user device based on the chat data transmitted from the user device and transferred by the chat server, the bot being one of the devices, and
the one of the filtering processes is performed before the chat server receives the chat data transmitted from the user device.
3. The data transfer method according to claim 1, wherein the chat system includes a chat server that transmits and receives the chat data to and from the user device, and a bot that autonomously generates chat data transmitted to the user device based on the chat data transmitted from the user device and transferred by the chat server, the bot being one of the devices, and the one of the filtering processes is performed before the bot receives the chat data transmitted from the user device.

4. The data transfer method according to claim 3, wherein the chat system includes a plurality of bots that autonomously generate chat data of different types, and the chat data including the content related to personal information is transferred to the bot, of the plurality of bots, for which transfer of the content related to personal information is permitted.

5. A non-transitory tangible machine-readable recording medium storing a computer program code, the computer program code that, when executed, causes a computer to:

detect that chat data transmitted to one of devices from a user device via a network includes a content related to personal information;

select one of filtering processes that is associated with the one of the devices when the chat data is determined to include the content related to personal information, wherein the filtering processes are different from each other; and perform the one of the filtering processes on the chat data, wherein the filtering processes include:

a first process that prohibits transferring a content related to personal information;

a second process that encrypts chat data including a content related to personal information; and a third process that replaces a content related to personal information with another content, wherein the devices include a first device, a second device, and a third device, wherein the computer program code further causes the computer to store user information and filtering process information associated with the user information in a memory, the filtering process information assigning the first process to the first device; assigning the second process to second device; and assigning the third process to the third device, and wherein when selecting one of the filtering processes, the computer program code further causes the computer to:

identify the filtering process information in the memory based on a user included in the chat data;

select the first process when a destination of the chat data is the first device;

select the second process when the destination of the chat data is the second device; and select the third process when the destination of the chat data is the third device.

6. A server for a chat system in which the server controls communication between a user device and devices via a network, the server comprising a processor, and a memory that stores a computer program code that, when executed, causes the processor to:

detect that chat data transmitted to one of the devices from the user device includes a content related to personal information;

select one of filtering processes that is associated with the one of the devices when the chat data is determined to include the content related to personal information, wherein the filtering processes are different from each other; and perform the one of the filtering processes on the chat data, wherein the filtering processes include:

a first process that prohibits transferring a content related to personal information;

a second process that encrypts chat data including a content related to personal information; and a third process that replaces a content related to personal information with another content, wherein the devices include a first device, a second device, and a third device, wherein the processor stores user information and filtering process information associated with the user information in a memory, the filtering process information assigning the first process to the first device; assigning the second process to second device; and assigning the third process to the third device, and wherein when selecting one of the filtering processes, the processor identifies the filtering process information in the memory based on a user included in the chat data;

selects the first process when a destination of the chat data is the first device;

selects the second process when the destination of the chat data is the second device; and selects the third process when the destination of the chat data is the third device.

7. The server according to claim 6, wherein the chat system includes a bot that autonomously generates chat data transmitted to the user device based on the chat data transmitted from the user device, the bot being one of the devices.

* * * * *